United States Patent [19]

Booth et al.

[11] 4,046,475

[45] Sept. 6, 1977

[54] EXPOSURE CONTROL SYSTEM FOR PHOTOCOMPOSITION MACHINES

[75] Inventors: Thomas Allan Booth, Flanders, N.J.; Frank Lynn Scholten, Katonah, N.Y.

[73] Assignee: Addressograph Multigraph Corporation, Cleveland, Ohio

[21] Appl. No.: 654,930

[22] Filed: Feb. 3, 1976

[51] Int. Cl.[2] .............................................. G03B 27/76

[52] U.S. Cl. .......................................... 355/69; 354/5; 354/7; 354/12; 354/15

[58] Field of Search ................. 354/4, 19; 355/67, 69, 355/70

[56] References Cited

U.S. PATENT DOCUMENTS

| | | | |
|---|---|---|---|
| 3,590,705 | 7/1971 | Moyroud | 354/10 |
| 3,748,036 | 7/1973 | Ogawa | 355/69 |
| 3,815,992 | 6/1974 | Ogawa | 355/69 |

*Primary Examiner*—Russell E. Adams

*Attorney, Agent, or Firm*—Ray S. Pyle

[57] ABSTRACT

In photocomposition, when change in point size is made, rather than change iris opening, a programmable flash intensity provides the required irradiance. Iris setting is made only to compensate for film or paper sensitivity, flash lamp efficiency, and energy storage capacitor variations.

2 Claims, 8 Drawing Figures

EXPOSURE CONTROL SYSTEM FOR PHOTOCOMPOSITION MACHINES

BACKGROUND OF THE INVENTION

Photocomposition machines operate essentially on the principle of a photographic enlarger or perhaps more closely to a motion picture projector. The later comparison is more accurate in that a photocomposition machine projects selected characters in rapid sequence.

In both the still projection or enlargement and the rapid sequence projection for motion picture display, the irradiance is selected by an iris adjustment and remains fixedly thereafter for the duration of the particular application. In the case of a photographic enlargement exposure, the iris is generally not altered until the complete exposure is made and then another adjustment is made for another font source before the next exposure. In the case of motion picture projection, the change in the optical system is made only as the age of the projection light source causes the intensity of the irradiance to change. It is a compensating adjustment rather than a positive selection for delivering alteration of the irradiance.

SUMMARY OF THE INVENTION

Straightforward photocomposition from a font source of characters is akin to motion picture projection in that the font source is carefully made of uniform density and hence there is no need to alter the iris size or the light intensity once these two variable factors have been properly selected in harmony with the photosensitive surface upon which the image is projected. However, printed text often requires point size change within a line of composition, and even more frequently requires the same machine to produce various point size text printing throughout a work period for various separate jobs.

The advantage of this invention and hence the principal object, is to produce a capability of instantaneous change in the radiance of the source in order to assure a constant irradiance at the image plane regardless of the point size selected.

It is a further object of the invention to accomplish the constant irradiance by the supply of a calculated radiant intensity with a fixed ratio of lens opening to focal length, known as *f*-number.

Another specific object of this invention is to provide an optical system which utilizes electronically controlled flash output with an iris adjustment of exposure level to accommodate paper sensitivity changes, long-term and similar variables. However, the electronically controlled flash output is provided to operate with a static iris setting during normal operation.

DESCRIPTION OF THE PREFERRED EMBODIMENT

Figure 1:
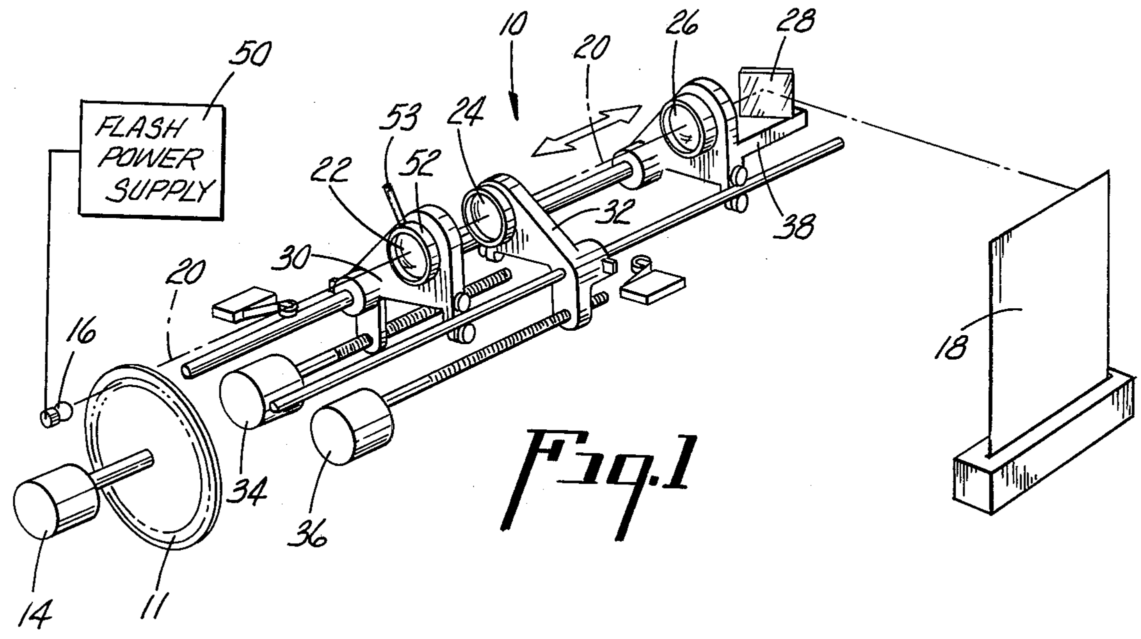
FIG. 1 is a simplified perspective view of the lens system associated with the present invention, and illustrating the flash lighting source diagrammatically.

Referring now more particularly to FIG. 1 of the drawings, the optical system associated with the present invention is generally indicated by the numeral 10 and includes a character storage disc 11 which is rotated by a drive motor 14. Preferably the disc is of a conventional type and contains various alphanumeric characters which are defined by transparent areas of conventional form. The disc is a carefully prepared font means for providing at least one font of characters to be projected. It is uniform in density and normally does not require a change in lamp intensity to produce a uniform irradiance at an image plane.

A conventional flash lamp 16 projects a selected character image through the lens system onto a photosensitive film indicated by the numeral 18.

It is well-known in the photocomposition art, how to construct and operate a timing system to place a selected character in alignment with the optical system and the flash lamp at a time when the flash lamp is energized to project the character. A character located in that position in the proper period of time is said to be presented at a projection location. Each time the projection light source flash lamp 16 is energized, a character image is projected along a path generally indicated by the numeral 20. The image is received by a variator lens 22 and projected into collimator lens 24. The light column from the collimating lens is parallel and does not come to a focus. Focusing is achieved by decollimating lens 26. The combination of the variator lens 22 to produce an aerial image of a selected size, and the further magnification of that aerial image by the collimator lens, is a variable magnification lens system used for producing the desired projected size of the character and for projecting the illuminated character from the font means to an image plane.

The light source lamp 16 is a high-intensity and short-duration flash coordinated to fire when a selected character of the font reaches projection position relative to the lens system.

Variator and collimator lenses 22 and 24 are mounted to carriages 30 and 32, respectively, which are controlled by stepper motors 34 and 36, or other appropriate drive means. Decollimating lens 26 and mirror 28 are mounted to a third carriage 38, which is driven through an oscillating path by any suitable reciprocating drive, such as a stepper motor. A complete variable magnification lens system, which includes the capability of projecting the illuminated character from the font means to the image plane, will include the decollimator lens and mirror with third carriage 38. The stepper motor which drives the carriage 38 is not illustrated, being out of view directly behind the carriage and lens in the FIG. 1.

Carriage 38 is moved laterally of the photosensitive member 18, whereby the selected characters are spaced across the photosensitive member to provide a composed line of type. Since the distance between the decollimator lens 26 and the photosensitive member remains constant, the movement of carriage 38 does not effect focusing of the image.

The structure thus far described is common with a prior art photocomposition equipment which, as in available photocomposition machines, employs a variable iris to establish an *f*-number which relates the degree of magnification to the speed of the optical system in order to produce a necessary irradiance at the image plane from the radiance of the light source to produce acceptable dark print copy. Operation of such prior art iris controlled devices is usually done by means of a frame-mounted cam surface and a follower arm on the iris rim. As the variator is moved longitudinally along the optical axis, the cam follower arm will ride the cam and actuate the iris to the predetermined *f*-number suitable for that degree of magnification.

Mechanical iris systems have functioned well for machines within a limited point size range. Whenever it is attempted to control an iris by cam action from a small point size, for example, around five-point, up to large point size in the vicinity of 72-point, the angle of the cam becomes so great in the latter range that binding occurs rather than actuation. Hence, control devices to overcome such cam binding are necessitated and usually they are complex and uncertain in their control function.

Accordingly, the object and direction of this invention is to provide a means for varying the irradiance at the image plane from the radiance of the light source, rather than strictly from *f*-number control of a lens by an iris.

In FIG. 1, a flash power supply 50 is illustrated as being in control of the light source lamp 16. The supply 50 is only a part of the overall computer controller which operates the entire photocomposer including character selection, and lens position for point size control. However, in view of the fact that this invention is directed to the concept of varying the irradiance of the light source as opposed to iris control, only that portion 50 of the complete controller is illustrated. The controller systems are now known in the art.

Although a control of the radiance is the intent of the invention, nevertheless an iris 52 and a control rod 53 are employed in the actual structure and illustrated in FIG. 1. The purpose of retaining this appendage of the prior construction is that variations in radiance requirements due to variations of photoreceptor sensitivity, flash lamp efficiency, and energy storage capacitors are more easily accommodated by a one-time setting of the iris than to tailor-make a radiance control for each particular radiance requirement. Once established for a particular radiance requirement, the iris is seldom further adjusted.

Figure 3:
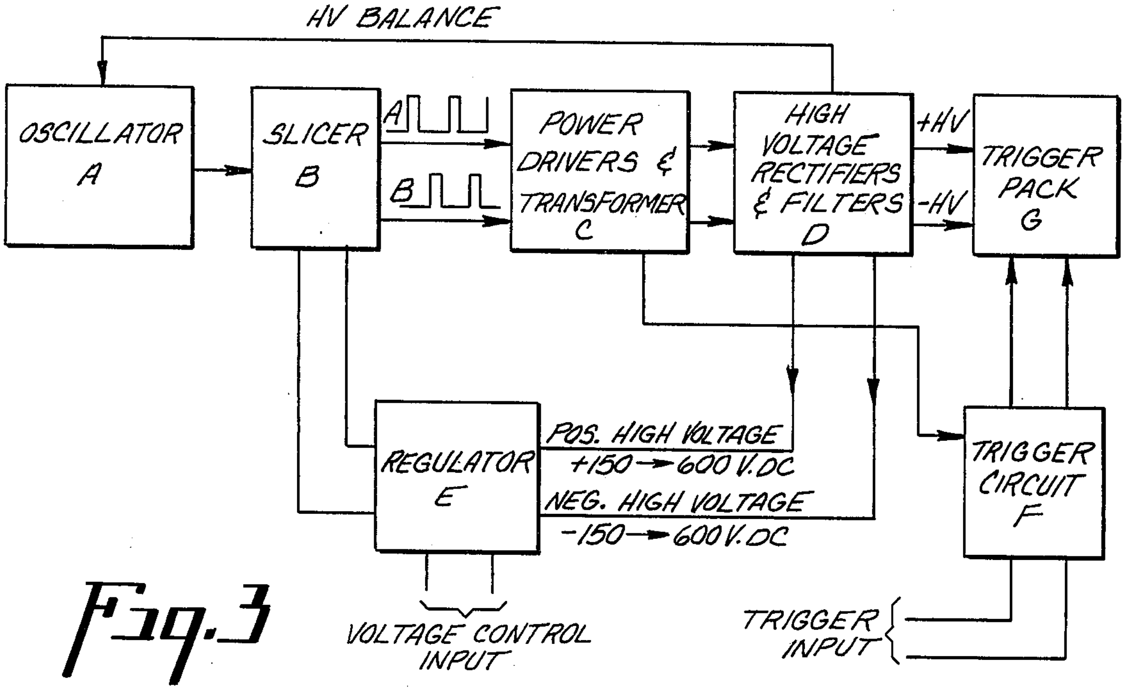
FIG. 3 is a block diagram of a high-voltage power supply which operates under the control of the present invention.
Figure 4A:
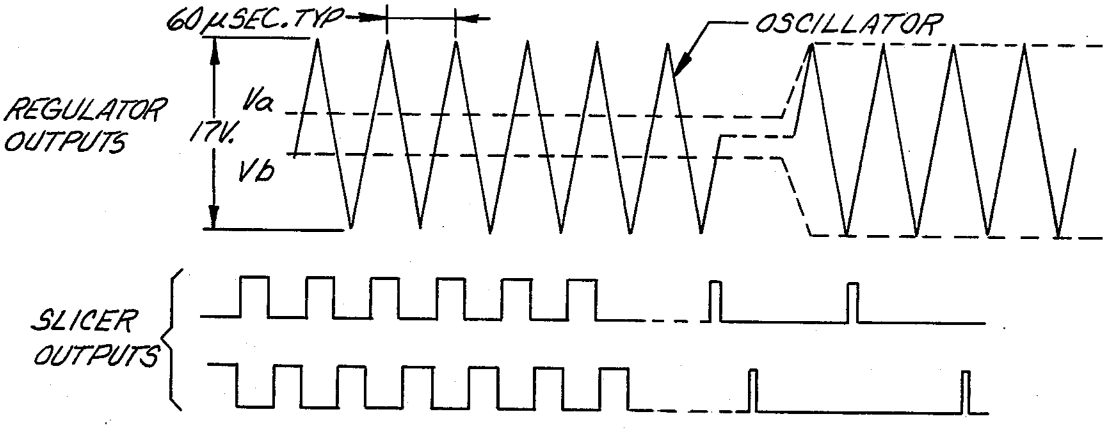
FIGS. 4A and 4B illustrate the output curves of components shown in FIG. 2 in relationship to time.
Figure 4B:
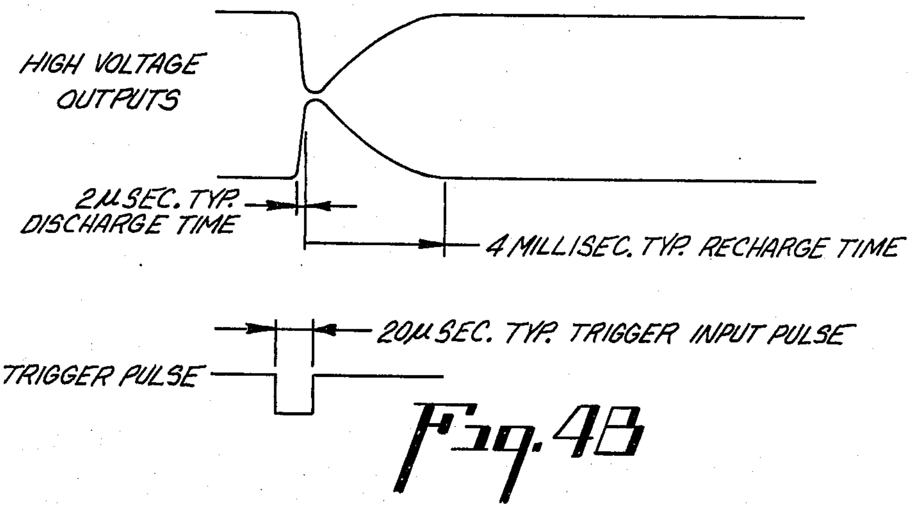

Referring to the block diagram of the high-voltage power supply FIG. 3, block A is shown as an oscillator which produces a wave shape output shown in typical wave forms as a triangle in Figure 4A.

Slicers, indicated as block B in FIG. 3, produce pulses alternately on the A and B lines, displaced from one another, in time. The block C contains power drivers and transformers. The slicers drive the power drivers and hence the transformers to produce a high-voltage alternating wave. This high-voltage alternating wave is further processed by rectifiers and filter capacitors in the voltage doubler circuit shown in block D to produce a high-voltage DC to recharge a capacitor on the trigger pack indicated as block G in FIG. 3 and feed back to the regulator shown in block E. The output of the regulator determines the point at which the triangular wave is to be sliced and thereby controls the width of the pulses going to the power drivers in the block D.

If the high voltage is fully charged, the regulator E will move the slicing point to a point beyond the peak of the triangular wave and the slicers will put out no pulse at all until such time as the high voltage discharges below a voltage set by the regulator E.

A trigger circuit, block F, FIG. 3, is comprised of a capacitor, an SCR and a trigger transformer. When a trigger pulse comes from a computer controller in the known manner, indicating the presence of a selected character at the projection position, the pulse fires the SCR and the capacitor discharges through the primary of a winding inside the trigger pack, and causes the flash lamp to fire.

The following technical description refers to the balance of the figures and circuits labeled in block format with the same name as schematic in FIG. 3.

Figure 5:
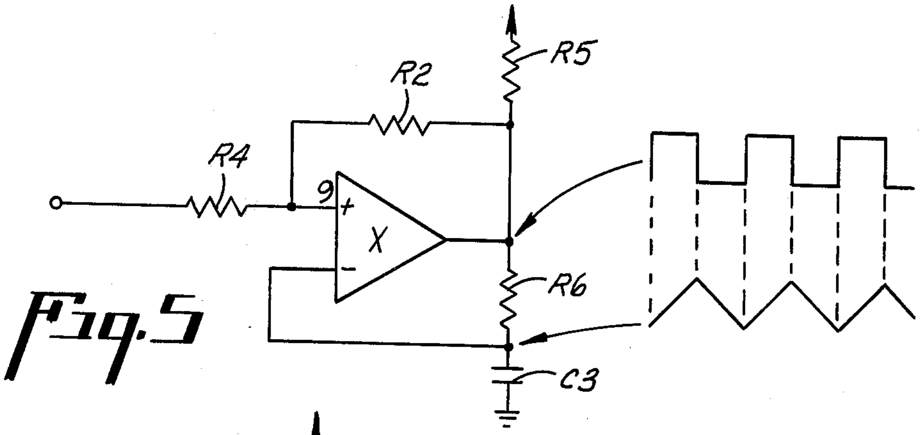
FIG. 5 is a simplified schematic of the oscillator of FIG. 3.

OSCILLATOR (See FIG. 5) The oscillator is built around a comparator X with positive feedback and an RC (Resistor Capacitor) circuit. Capacitor C-3 charges up through resistors R-5 and R-6 until the voltage is equal to the voltage at terminal 9 of the comparator at which time the output pin 14 switches low and the capacitor begins to discharge through R-6. The voltage at pin 9 switches with the output and sets the high and low voltage of the triangular wave across capacitor C-3. FIG. 5 is a simplifed schematic showing resistance R-4 connected to a voltage source. The positive peak of the triangular wave will then be determined by the voltage divider R-5, R-2 and R-4, and the negative peak when pin 14 is low by R-2 and R-4.

The typical peak-to-peak voltage is approximately 17 volts and the period is about 60 micro seconds. (See FIG. 4A.)

Figure 6:
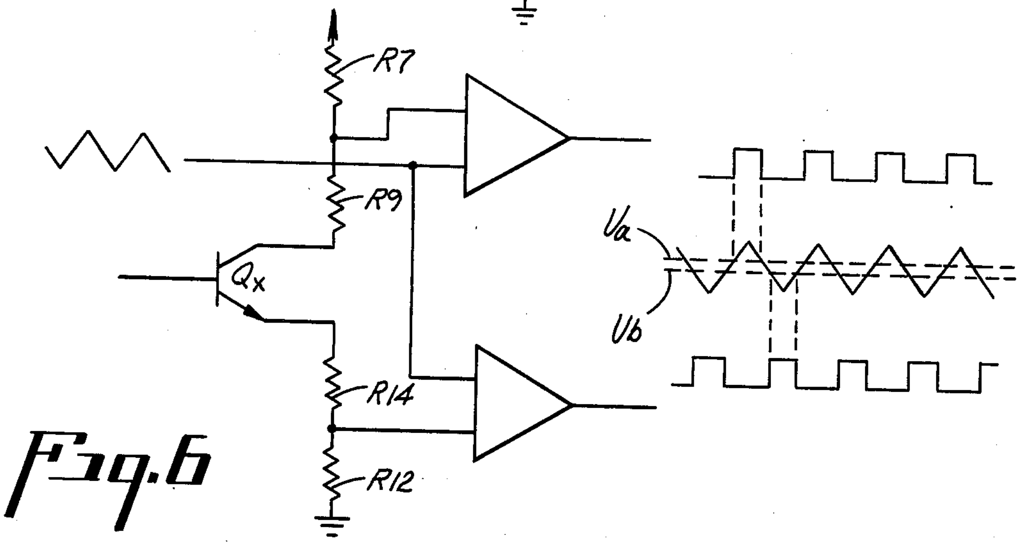
FIG. 6 is a simplified schematic of the slicer shown in FIG. 3.

SLICERS (See FIG. 6.) The slicers as shown in block B are built from two additional sections of a quad comparator. Each section compares the triangular wave to a reference voltage designated V*a* or V*b* shown in FIG. 4A. The upper comparator emits a positive pulse whenever the triangular wave is more negative than the reference V*b*. If the current is low, the reference voltages V*a* and V*b* will be outside the peaks of the triangular wave and the comparators will not emit any pulses. The transistor $Q_x$ is inside the voltage regulator and is inclined to show the path of the current.

In the actual circuit hysteresis is provided around each comparator to insure that they do not oscillate near the switching time.

POWER DRIVERS

The power drivers of the block C in FIG. 3 are Darlington power transistors which amplify the signal provided by the slicers and drive the transformer alternately positive and negative. The peak-to-peak collector voltage is approximately 50 volts and the collector currents reach a peak of approximately 4 amperes when the flash capacitor is being recharged.

TRANSFORMER

The transformer is a pot core ferrite transformer with a high-turns ratio. The primary is driven at 50 volt peak-to-peak and therefore the secondary reaches a typical voltage of 1,500 volts peak-to-peak. The additional turns on the primary provide approximately 75 volts peaked to charge a trigger capacitor.

REGULATORS

Figure 7:
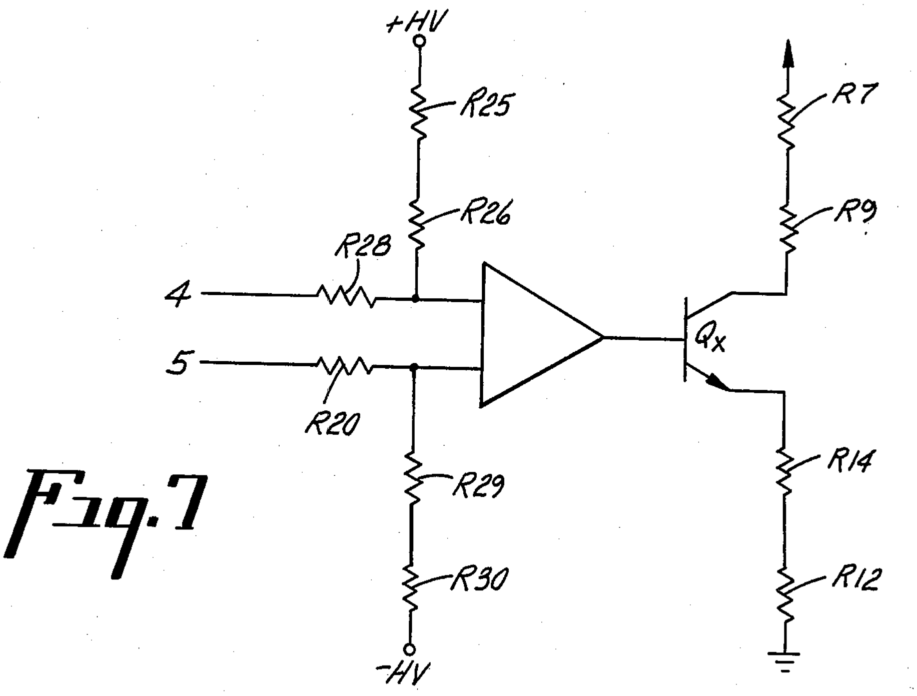
FIG. 7 illustrates the essential portions of an integrated circuit chip serving as the regulator of FIG. 3.

The regulator is built around a precision voltage regulator. FIG. 7 is a simplified schematic of the regulator section.

The inputs to the internal differential amplifier are taken from voltage divider networks off the positive and negative high voltage. Because the voltage between the inputs is a direct ratio to the high voltage, the output will also vary proportionately, but amplified. The ratio is determined by the setting from an input line 5 shown in FIG. 7 and resistors R-25, R-26, R-28 and R-20, R-29 and R-30. The output transistor $Q_x$ and the resistors R-7, R-9, R-12 and R-14 make up a balanced phase-splitting network, which means that the voltage drop across resistor R-7 equals the voltage rise across resistor R-12 and the voltage drop across resistor R-9 equals the voltage rise across R-14. This is the same divider as shown in FIG. 6.

Although it is conceivable that the irradiance at the image plane from the radiance of the light source could be modified by a screening device, this preferred embodiment is directed to the concept of a use of a program in the controller of a phototypesetter working through a digital-to-analog converter for establishing a variable voltage at input 5 in FIG. 7.

Figure 2:
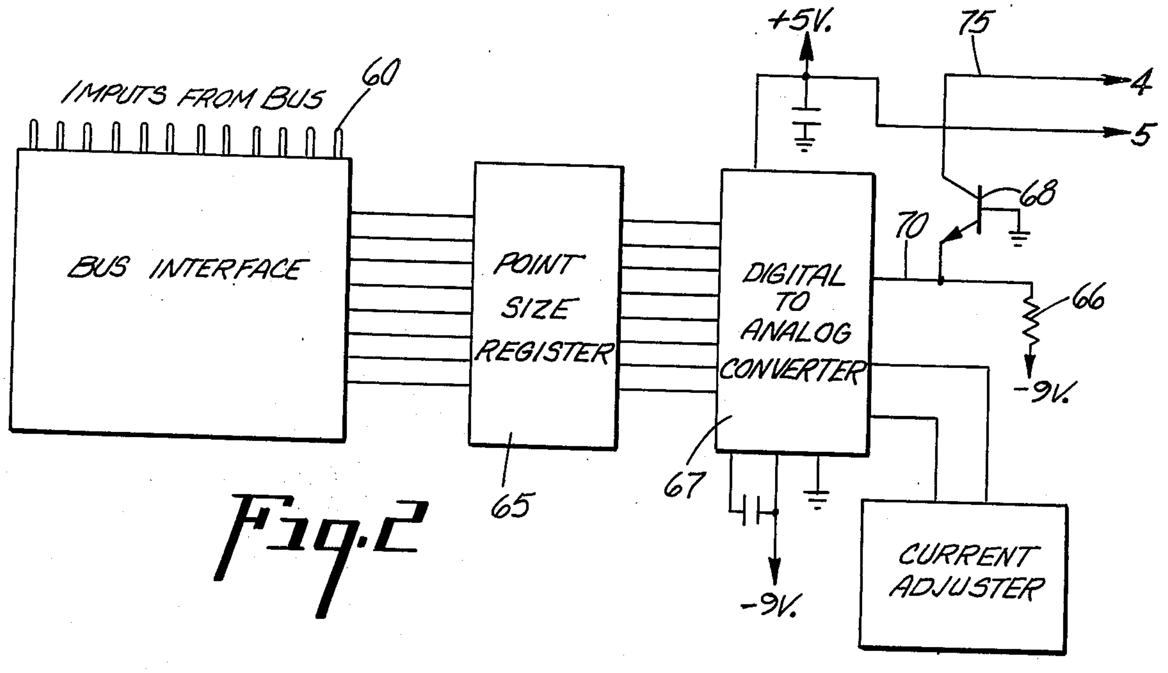
FIG. 2 is a general illustration of an electronic system operable as a preferred embodiment of the equipment to produce the results of the present invention.

FIG. 2 illustrates a control board with an interface which receives input signals through a series of plug-in pins 60 at the end of the board. The interface interprets signals from the computer to cause the control board of FIG. 2 to recognize coding intended for establishing the light source intensity. The interface transmits a digital number to point size register 65 supplied through the interface from the computer program. The point size number placed in register 65 is preestablished in the program to identify a voltage that is required for a particular point size which the controller has established through adjustment of the variator and collimator lenses as previously described.

The point size register establishes a current flow in the digital-to-analog converter 65.

A negative 9-volt source operating through a resistor 66 is a constant current to provide an offset bias in a transistor 68. The variable current from the digital-to-analog converter 65 is established in line 70 and the current from the minus-9 volt source and the converter 65 are summed at the emiter of the transistor 68 to establish a control current in line 75 to line 4, which corresponds to line 4 in the FIG. 7. The line 5 in FIG. 7 is then connected to a positive 5-volt source as illustrated in FIG. 2.

Once the program of the controller has established a desired current flow to thereby establish regulation of the high-voltage flash power supply as described, the trigger pack G in FIG. 3 is operated by a trigger circuit in the block F of FIG. 3.

A flash is initiated by discharging a capacitor through the primary of a transformer which is internal to the trigger pack G. When the program has established the presence of a character in the projection position, a pulse is established in the flash trigger to cause the trigger pack to fire and discharge a predetermined amount of energy through the flash lamp 16 which is at a level calculated to produce the proper radiance for the given point size selected by the computer through manipulation of the lens system.

What is claimed is:

1. In a photocomposition machine, an exposure control system for providing irradiance of an optically projected image, of an intensity which will provide full exposure of a photosensitive receptor for a selected area of the image in a predetermined time on an image plane, comprising:

- a font means for providing at least one font of characters to be projected and presenting individual characters at a projection location;
- a projection light source to illuminate said font of characters;
- a variable magnification lens system for producing the desired projected size of the character and for projecting the illuminated character from said font means to an image plane;
- said light source being a high-intensity and short-duration flash coordinated to fire when a selected character of the font reaches a projection position relative to said lens system;
- a register for storing a digital number representative of the particular point size to be projected;
- a controller means for accepting input coding impelling the register to output to a digital-to-analog converter; and
- means for utilizing the analog output to supply a corresponding level of electrical energy to said projection light source.

2. In a photocomposition machine, an exposure control system for providing irradiance of an optically projected image, of an intensity which will provide full exposure of a photosensitive receptor for a selected area of the image in a predetermined time on an image plane, comprising:

- a font means for providing at least one font of characters to be projected and presenting individual characters at a projection location;
- a projection light source to illuminate said font of characters;
- a variable magnification lens system for producing the desired projected size of the character and for projecting the illuminated character from said font means to an image plane;
- said light source being a high-intensity and short-duration flash having an output radiance variable in proportion to applied voltage and coordinated to fire when a selected character of the font reaches a projection position relative to said lens system;
- a register for storing a digital number representative of the particular point size to be projected;
- a controller means for accepting input coding and impelling the register to output to a digital-to-analog converter; and
- means for utilizing the analog output to supply a corresponding level of electrical energy to said projection light source.

* * * * *

UNITED STATES PATENT OFFICE
CERTIFICATE OF CORRECTION

PATENT NO. : 4,046,475

DATED : September 6, 1977

INVENTOR(S) : Thomas Allen Booth and Frank Lynn Scholten

It is certified that error appears in the above-identified patent and that said Letters Patent are hereby corrected as shown below:

Column 5, lines 44, 48 and 50, the reference numeral 65, each occurrence, should read -- 67 --.

Column 5, line 50, "emiter" should read -- emitter --.

Signed and Sealed this

*Sixteenth* Day of *May 1978*

[SEAL]

*Attest:*

RUTH C. MASON
*Attesting Officer*

LUTRELLE F. PARKER
*Acting Commissioner of Patents and Trademarks*

Disclaimer 4,046,475.—*Thomas Allan Booth*, Flanders, N.J. and *Frank Lynn Scholten*, Katonah, N.Y. EXPOSURE CONTROL SYSTEM FOR PHOTO-COMPOSITION MACHINES. Patent dated Sept. 6, 1977. Disclaimer filed Nov. 28, 1979, by the assignee, *AM International, Inc.*

Hereby enters this disclaimer to claims 1 and 2 of said patent.

[*Official Gazette, April 1, 1980.*]